United States Patent
Ramasamy et al.

(10) Patent No.: US 6,898,785 B2
(45) Date of Patent: May 24, 2005

(54) HANDLING CALLS FROM RELOCATED INSTRUMENTED FUNCTIONS TO FUNCTIONS THAT EXPECT A RETURN POINTER VALUE IN AN ORIGINAL ADDRESS SPACE

(75) Inventors: Vinodha Ramasamy, Campbell, CA (US); Eric Gouriou, Sunnyvale, CA (US); Robert Hundt, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 634 days.

(21) Appl. No.: 09/930,937

(22) Filed: Aug. 16, 2001

(65) Prior Publication Data

US 2003/0037318 A1 Feb. 20, 2003

(51) Int. Cl.$^7$ .............................. G06F 9/44; G06F 11/00
(52) U.S. Cl. ....................... 717/129; 717/130; 717/131; 717/133; 714/34
(58) Field of Search ................................ 717/129–131, 717/133; 714/34

(56) References Cited

U.S. PATENT DOCUMENTS

| | | | |
|---|---|---|---|
| 5,142,679 A | * | 8/1992 | Owaki et al. ................ 717/151 |
| 5,313,616 A | * | 5/1994 | Cline et al. ................. 717/130 |
| 5,491,808 A | * | 2/1996 | Geist, Jr. ..................... 711/100 |
| 5,509,131 A | * | 4/1996 | Smith et al. ................ 711/206 |
| 5,903,758 A | * | 5/1999 | Walker ........................ 717/130 |
| 5,950,003 A | * | 9/1999 | Kaneshiro et al. .......... 717/130 |
| 6,026,235 A | * | 2/2000 | Shaughnessy ............... 717/130 |
| 6,026,236 A | * | 2/2000 | Fortin et al. ................ 717/130 |
| 6,126,328 A | * | 10/2000 | Mallory et al. ............. 717/129 |
| 6,334,213 B1 | * | 12/2001 | Li ............................... 717/170 |
| 6,629,123 B1 | * | 9/2003 | Hunt ........................... 717/131 |
| 6,721,941 B1 | * | 4/2004 | Morshed et al. ............ 717/130 |
| 6,760,907 B2 | * | 7/2004 | Shaylor ....................... 717/130 |

OTHER PUBLICATIONS

M. Copperman, "Debugging Optimized Code Without Being Misled", 1994, ACM, pp. 387–427.*

* cited by examiner

Primary Examiner—Wei Y. Zhen
Assistant Examiner—Qamrun Nahar

(57) ABSTRACT

Method and apparatus for handling calls from relocated instrumented functions to functions that expect a return pointer value in an original address space. In various embodiments of the invention, instrumented versions of selected functions of an executable program are generated and stored in a relocation address space. When a function is called by a function in the relocation address space, a return pointer register stores a first return-pointer value that is an address in the relocation address space. The address in the original address space that corresponds (logically) to the first return-pointer value is identified as an original return-pointer value. The first return-pointer value is associated with the original return-pointer value, references to the original return-pointer value are substituted for references to the first return-pointer value, and the instruction at the address indicated by the original return-pointer value is replaced with a breakpoint. When the breakpoint is encountered upon return of control at the original return-pointer value, the first return-pointer value that is associated with the original return-pointer value is obtained, and control is transferred to the instruction at the address referenced by the first return-pointer value.

14 Claims, 3 Drawing Sheets

HANDLING CALLS FROM RELOCATED INSTRUMENTED FUNCTIONS TO FUNCTIONS THAT EXPECT A RETURN POINTER VALUE IN AN ORIGINAL ADDRESS SPACE

FIELD OF THE INVENTION

The present invention generally relates to instrumentation of executable computer program code, and more particularly to handling calls from relocated functions to other functions that expect the value in a return pointer register to reference the original address space from which the function was relocated.

BACKGROUND

Analysis of binary executable programs is performed to analyze program performance, verify correctness, and test correct runtime operation, for example. Some analyses are performed prior to runtime (static analysis), while other analyses are performed during runtime (dynamic analysis). For both static and dynamic analysis, however, the analysis is often performed at the function level.

The term, "function", refers to named sections of code that are callable in the source program and encompasses routines, procedures, methods and other similar constructs known to those skilled in the art. The functions in the source code are compiled into segments of executable code. For convenience, the segments of executable code that correspond to the functions in the source code are also referred to as "functions".

A function is a set of instructions beginning at an entry point and ending at an endpoint. The entry point is the address at which execution of the function begins as the target of a branch instruction. The endpoint is the instruction of the function from which control is returned to the point in the program at which the function was initiated. For functions having multiple entry points and/or multiple endpoints, the first entry point and the last endpoint define a function.

One category of analysis performed on executable programs is "instrumentation". Instrumentation is generally used to gather runtime characteristics of a program. For example, the number of times that a function is executed while the application is executing is determined through instrumentation. While the information gathered through instrumentation may be extremely useful for purposes of enhancing program performance, the process of setting up a program for instrumentation can be time-consuming.

Some dynamic instrumentation tools relocate instrumented functions into a shared memory address space during execution of the program. The shared memory space is allocated by the instrumentation tool and shared by the instrumentation tool and the executable program. The instrumented functions in the shared memory space are executed in lieu of the un-instrumented versions of the functions in the original address space. Some instrumented functions in the shared memory space may call other instrumented functions in the shared memory space, depending on the application.

Where one function ("caller" or "calling" function) calls another function ("called function"), a return pointer (RP) register is used in some computer architectures for some functions to return control from the called function to the calling function. For example, Hewlett Packard's IA-64 instruction architecture uses a return pointer register.

Some functions require that the value in the return pointer register reference an address within the original address space. For example, the function may use the return pointer value for comparison and expect the value to be in the original address space. If the return pointer value is an address within the shared memory space, the program will abort because of a memory reference that is out of a recognized range.

A method and apparatus that address the aforementioned problems, as well as other related problems, are therefore desirable.

SUMMARY OF THE INVENTION

The invention provides a method and apparatus for handling return of control in calls by relocated, instrumented functions to other functions that expect a return pointer value in the original address space. In various embodiments of the invention, instrumented versions of selected functions of an executable program are generated and stored in a relocation address space. When a function is called by a function in the relocation address space, a return pointer register stores a first return-pointer value that is an address in the relocation address space. The address in the original address space that corresponds (logically) to the first return-pointer value is identified as an original return-pointer value. The first return-pointer value is associated with the original return-pointer value, references to the original return-pointer value are substituted for references to the first return-pointer value, and the instruction at the address indicated by the original return-pointer value is replaced with a breakpoint. When the breakpoint is encountered upon return of control at the original return-pointer value, the first return-pointer value that is associated with the original return-pointer value is obtained, and control is transferred to the instruction at the address referenced by the first return-pointer value.

Various example embodiments are set forth in the Detailed Description and claims which follow.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
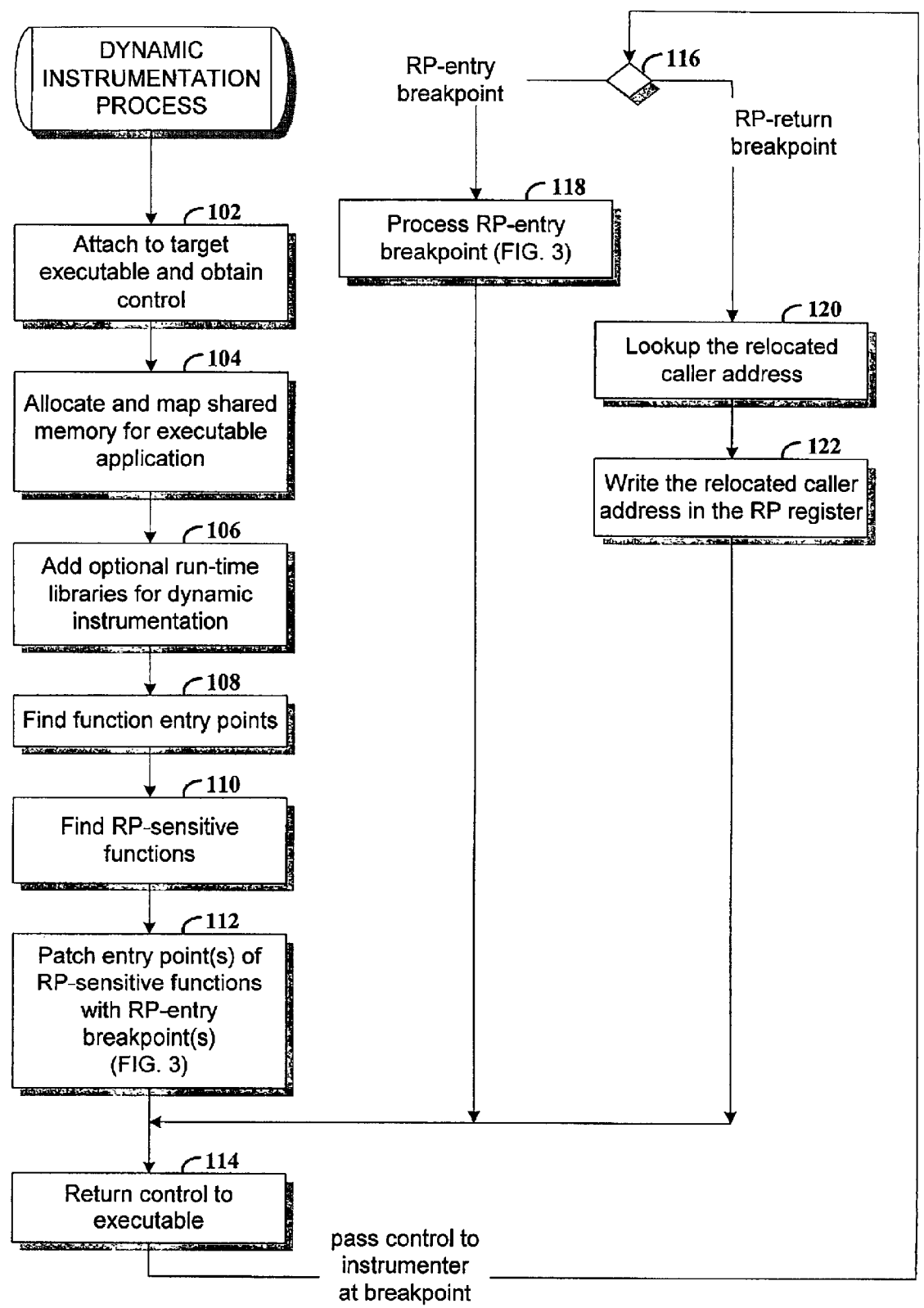
FIG. 1 is a flowchart of a process for dynamic instrumentation of executable program code in accordance with one embodiment of the invention.

FIG. 1 is a flowchart of a process for dynamic instrumentation of executable program code in accordance with one embodiment of the invention. The process generally entails generating instrumented versions of RP-sensitive functions that are called during execution of the executable application.

At step 102, an instrumentation process attaches to a target executable application and obtains control. Those skilled in the art will appreciate that this step can in one embodiment be accomplished using known techniques. At step 104, the process allocates and maps shared memory for use by the instrumentation process and the executable application. In one embodiment, the process for allocating an mapping shared memory is implemented consistent with the teachings of the patent application entitled, "DYNAMIC INSTRUMENTATION OF AN EXECUTABLE PROGRAM", by Hundt et al., filed on Apr. 11, 2001, and having patent/application Ser. No. 09/833,248, the contents of which are incorporated herein by reference.

At step 106, optional run-time libraries are added for dynamic instrumentation. These run-time libraries include, for example, code to dynamically increment counters of indirect branch targets and code to perform a system call to register an instrumented function to the dynamic loader.

At step 108, entry points of the functions in the executable application are located. In various embodiments, the present invention uses compiler-generated checkpoints to identify function entry points and endpoints in executable program code. The function entry points and end-points are then used to support analysis of the executable program code. Compiler-generated checkpointing is described in the patent/application entitled, "COMPILER-BASED CHECKPOINTING FOR SUPPORT OF ERROR RECOVERY", by Thompson et al., filed on Oct. 31, 2000, and having patent/application Ser. No. 09/702,590, the contents of which are incorporated herein by reference.

At step 110, functions that are RP-sensitive are identified. An RP-sensitive function is a function that expects the value of the return pointer to reference the original address space. In one embodiment, the functions are specified in a list of function names that is input to the instrumentation tool. Alternatively, the instrumentation tool analyzes the program code for RP-sensitive functions. In analyzing the code, the tool searches for code that accesses the return-pointer register in a manner other than return of control. At step 112, the entry points of the RP-sensitive functions are patched with RP-entry breakpoints. An RP-entry breakpoint is a special breakpoint that is caught by the instrumentation process so that the instrumentation process can perform additional return pointer processing.

At step 114, control is returned to the executable application, and the executable program continues execution until a breakpoint is encountered. It will be appreciated that the instrumentation tool may insert a variety of different types of breakpoints in the executable program. However, the present description is limited to special breakpoints (RP-entry and RP-return) that are used in dealing with RP-sensitive functions. When an RP-type breakpoint is encountered, control is returned to step 116 of the instrumentation process.

Figure 3:
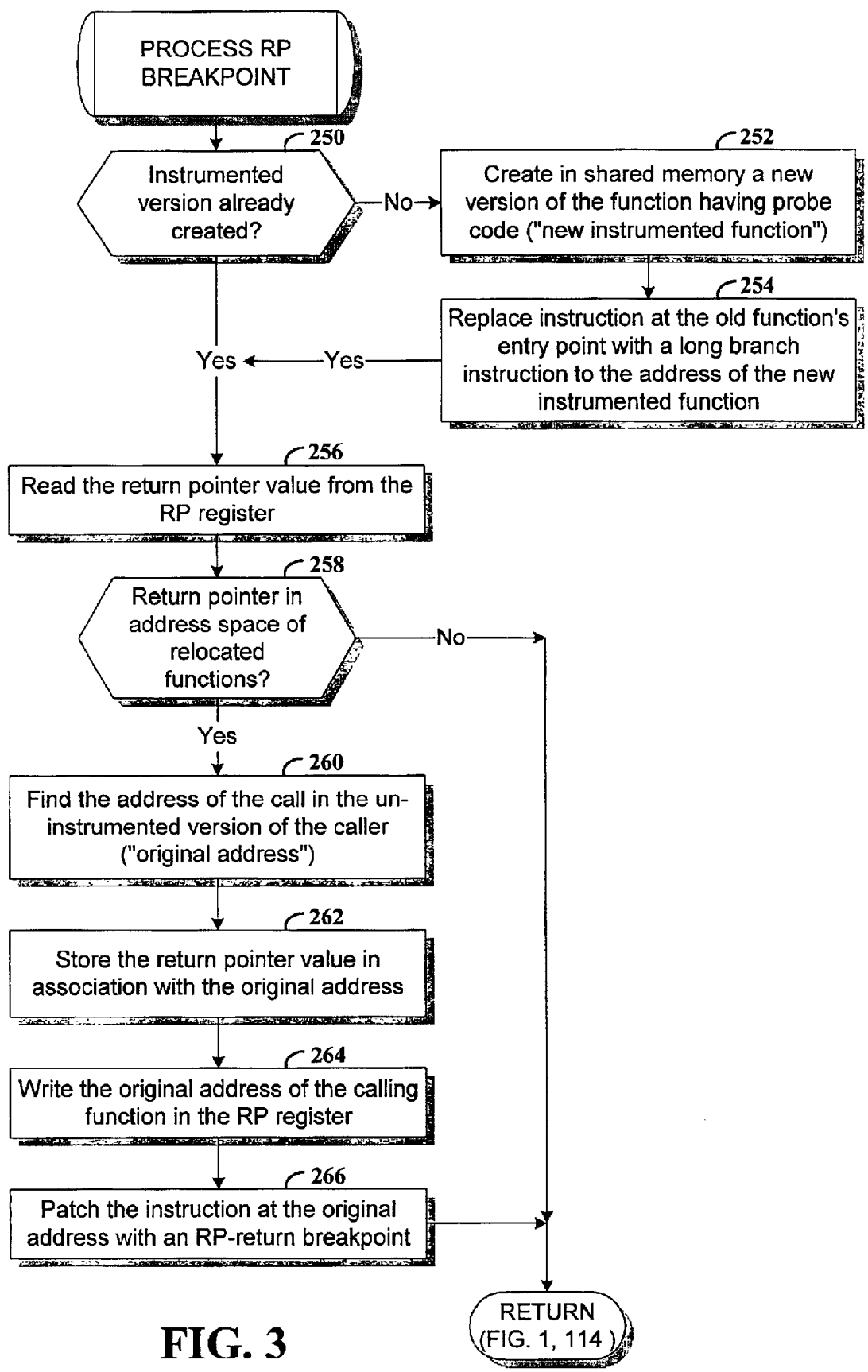
FIG. 3 is a flowchart of the process that follows a return-pointer-entry breakpoint in accordance with one embodiment of the invention.

For an RP-entry breakpoint, the process proceeds to step 118, where the process of FIG. 3 is performed when an RP-sensitive function is invoked. Upon first encountering the RP-entry breakpoint of a function, the instrumented version of the RP-sensitive function is generated. If the caller is in the shared memory space, an RP-return breakpoint is inserted in the un-instrumented version of the function (in the original address space) at a position corresponding to the return pointer value (that references the call from the instrumented function). The return pointer value is saved in association with the address of the RP-return breakpoint in the un-instrumented function, and the return pointer register is updated with the address (in the un-instrumented function) at which the RP-return breakpoint was written. Control is then returned to the executable program at step 114. It will be appreciated that at this juncture, the executable program continues with the instrumented RP-sensitive function.

When an RP-sensitive function that was called by an instrumented function completes execution, control is returned to the un-instrumented version of the caller at the address having the RP-return breakpoint. The RP-return breakpoint causes control to return to the instrumentation process at step 116. For the RP-return breakpoint, control is directed to step 120, where the address in the instrumented caller is obtained using the associated address of the RP-return breakpoint. Recall that during processing resulting from the RP-entry breakpoint, the instrumentation process associated the return pointer address in the instrumented (also, "relocated") caller with the return pointer address in the un-instrumented caller. At step 122, the return pointer register is updated with the address in the instrumented caller. Thereby control is returned to the instrumented caller when control is returned to the executable program at step 114.

Figure 2:
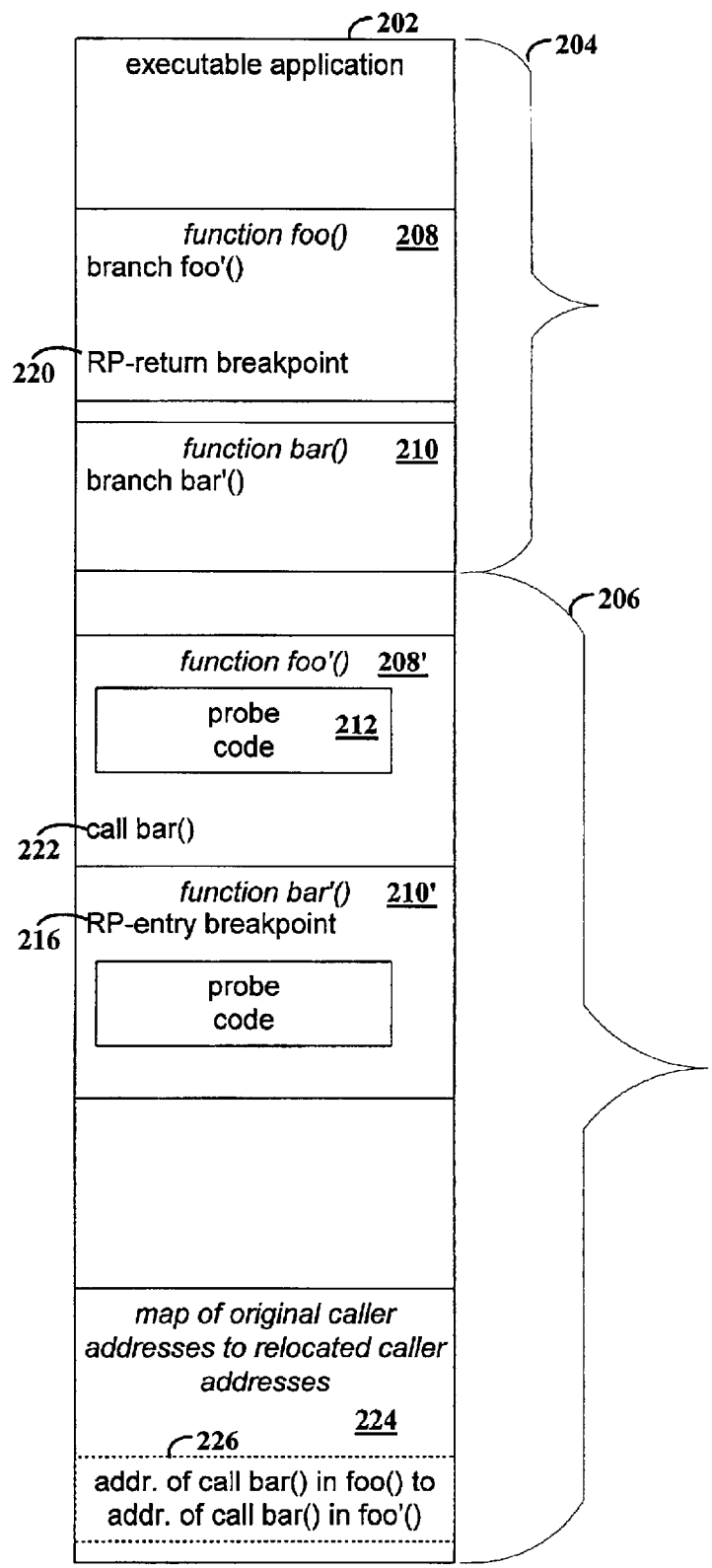
FIG. 2 is a block diagram of executable code in which instrumented versions of selected functions have been generated.

FIG. 2 is a block diagram of executable code in which instrumented versions of selected functions have been generated. The executable program 202 includes original address space 204 and shared address space 206, which is used for storage of relocated, instrumented functions. Shared address space 206 is also referenced herein as "relocated address space."

Executable program 202 illustrates two functions, foo( ) 208 and bar( ) 210. Instrumented versions of foo( ) and bar( ) are created and are designated as foo( ) 208' and bar'( ) 210' in shared address space 206. When an instrumented version of foo( ) is generated, probe code 212 is generated for foo'( ) in the shared address space 206. In addition, the first instruction of foo'( ) 208 is replaced with an instruction to branch to foo'( ).

In the present example, the function bar'( ) 208 is an RP-sensitive function that is called by foo'( ) 208'. Since bar'( ) is RP-sensitive, the first instruction is an RP-entry breakpoint 216. When bar'( ) is called from foo'( ), the RP-entry breakpoint causes the instrumentation process to find in foo( ) the corresponding call to bar( ). The address in foo( ) 208 is patched with an RP-return breakpoint 220, the address in foo( ) is associated with the current return pointer value (call bar( ) 222 in foo'( )), and the RP register is updated with the address in foo( ). Block 224 illustrates the mapping of original caller addresses to relocated caller addresses, and block 226 illustrates the mapping of the addresses in which bar( ) is called from foo( ) and bar is called from foo'( ).

FIG. 3 is a flowchart of a process that ensues from an RP-entry breakpoint in accordance with one embodiment of the invention. Decision step 250 tests whether an instrumented version of the function has already been created. If not, the process continues at step 252 where an instrumented version of the function is created in shared memory space. In creating the instrumented version of the function, the RP-entry breakpoint is preserved so that subsequent invocations of the function perform the necessary return pointer processing. At step 254, the instruction at the entry point of the un-instrumented version is replaced with a branch instruction having a target that references the instrumented version of the function in the shared memory space.

If (or after) an instrumented version of the function has already been created, the process continues at step 256, where the return pointer value is read from the return pointer register. If the return pointer value references an address in the shared memory space, which means that the caller is a relocated function, decision step 258 directs the process to step 260. At step 260, the process obtains the address in the un-instrumented version of the caller that corresponds to the address in the instrumented version of the caller from which the called function was called. For brevity, the address is referred to as the "original address." In one embodiment, the instrumentation tool maintains a function dictionary, which maps the function entry points to function names, and the original address is derived from the address in the function dictionary. At step 262, the original address is stored in association with the return pointer value. The association is later used to restore the return pointer value upon return from the called function. The original address is stored in the return pointer register at step 264, and at step 266, the instruction at the original address is patched with an RP-return breakpoint. The instrumentation process then returns to step 114 of FIG. 1.

What is claimed is:

1. A computer-implemented method for instrumentation of selected functions in an executable program, the selected functions initially occupying an original address space of the executable program, comprising:

generating instrumented versions of selected functions in relocation address space during program execution;

when a function is called by an instrumented version of a selected function within the relocation address space resulting in a first return-pointer value in the relocation address space, identifying a location in the original address space corresponding to the first return-pointer value as an original return-pointer value, associating the first return-pointer value with the original return-pointer value, substituting references to the original return-pointer value for references to the first return-pointer value, and replacing an instruction at the address indicated by the original return-pointer value with a breakpoint; and when the breakpoint is encountered upon return of control at the original return-pointer value, obtaining the first return-pointer value associated with the original return-pointer value, and transferring control to an instruction at the address referenced by the first return-pointer value.

2. The method of claim 1, further comprising identifying RP-sensitive functions as the selected functions, wherein RP-sensitive functions are those functions that require a return pointer value in the original address space of the executable program.

3. The method of claim 2, further comprising:

patching entry points of the RP-sensitive functions with RP-entry breakpoints; and generating an instrumented version of an RP-sensitive function upon encountering the RP-entry breakpoint at the entry point of the RP-sensitive function.

4. The method of claim 3, wherein each instrumented version of an RP-sensitive function has a corresponding original version function in the original address space, further comprising replacing instructions at entry points of the original versions of the RP-sensitive functions with branch instructions targeting corresponding instrumented versions of the RP-sensitive functions.

5. The method of claim 4, further comprising identifying the RP-sensitive functions through analysis of code segments within the executable program.

6. The method of claim 4, further comprising identifying the RP-sensitive functions through an input list of identifier codes associated with RP-sensitive functions.

7. The method of claim 2, wherein each instrumented version of an RP-sensitive function has a corresponding original version function in the original address space, further comprising replacing instructions at entry points of the original versions of the RP-sensitive functions with branch instructions targeting corresponding instrumented versions of the RP-sensitive functions.

8. The method of claim 2, further comprising identifying the RP-sensitive functions through analysis of code segments within the executable program.

9. The method of claim 2, further comprising identifying the RP-sensitive functions through an input list of identifier codes associated with RP-sensitive functions.

10. The method of claim 2, further comprising:

generating the relocation address space;

inserting RP-entry breakpoints at entry points of the RP-sensitive functions; and upon encountering an RP-entry breakpoint during execution of the executable program, generating an instrumented version of the RP-sensitive function associated with the RP-entry breakpoint, and replacing the RP-entry breakpoint with a branch instruction that targets the instrumented version of the RP-sensitive function.

11. A computer-implemented method for instrumentation of selected functions in an executable program, the selected functions initially occupying an original address space of the executable program, comprising:

generating relocation address space;

identifying RP-sensitive functions in the executable program, wherein RP-sensitive functions are those functions that require a return pointer value in the original address space;

inserting RP-entry breakpoints at entry points of the RP-sensitive functions;

upon encountering an RP-entry breakpoint during execution of the executable program, generating an instrumented version of the RP-sensitive function associated with the RP-entry breakpoint, and replacing the entry point of the RP-sensitive function in the original address space with a branch instruction that targets the instrumented version of the RP-sensitive function;

when an instrumented version of RP-sensitive function is called from a function in the relocation address space whereby a return-pointer register stores a first return-pointer value within the relocation address space, identifying a location in the original address space corresponding to the first return-pointer value as an original return-pointer value, associating the first return-pointer value with the original return-pointer value, storing the original return-pointer value in the return-pointer register, and replacing an instruction at the address indicated by the original return-pointer value with an RP-return breakpoint; and when the RP-return breakpoint is encountered upon return of control at the original return-pointer value, obtaining the first return-pointer value associated with the original return-pointer value, restoring the first return-pointer value to the return-pointer register, and transferring control via the return pointer register.

12. The method of claim 11, further comprising identifying the RP-sensitive functions through analysis of code segments within the executable program.

13. The method of claim 11, further comprising identifying the RP-sensitive functions through an input list of identifier codes associated with RP-sensitive functions.

14. An apparatus for instrumentation of selected functions in an executable program, the selected functions initially occupying an original address space of the executable program, comprising:

means for generating instrumented versions of selected functions in relocation address space during program execution;

means, responsive to a call to an instrumented version of a selected function from within the relocation address space whereby a first return-pointer value is within the relocation address space, for identifying a location in the original address space corresponding to the first return-pointer value as an original return-pointer value, associating the first return-pointer value with the original return-pointer value, substituting references to the original return-pointer value for references to the first return-pointer value, and replacing an instruction at the address indicated by the original return-pointer value with a breakpoint; and means, responsive to encountering the breakpoint upon return of control at the original return-pointer value, for obtaining the first return-pointer value associated with the original return-pointer value, and transferring control to an instruction at the address referenced by the first return-pointer value.

* * * * *